United States Patent
Mao et al.

(10) Patent No.: US 8,176,336 B1
(45) Date of Patent: May 8, 2012

(54) SOFTWARE TRUSTED COMPUTING BASE

(75) Inventors: Wenbo Mao, Beijing (CN); Haibo Chen, Shanghai (CN); Jun Li, Beijing (CN); Jingcheng Zhang, Beijing (CN)

(73) Assignee: EMC Corporation, Hopkinton, MA (US)

( * ) Notice: Subject to any disclaimer, the term of this patent is extended or adjusted under 35 U.S.C. 154(b) by 809 days.

(21) Appl. No.: 12/339,265

(22) Filed: Dec. 19, 2008

(51) Int. Cl.
*H04L 29/06* (2006.01)
(52) U.S. Cl. .......................................... 713/189; 726/26
(58) Field of Classification Search .................. None
See application file for complete search history.

(56) References Cited

U.S. PATENT DOCUMENTS

| | | | |
|---|---|---|---|
| 6,922,774 B2 * | 7/2005 | Meushaw et al. | 713/151 |
| 7,865,712 B2 * | 1/2011 | Levit-Gurevich et al. | 713/2 |
| 8,068,613 B2 * | 11/2011 | Scaralata | 380/283 |
| 2002/0194482 A1 * | 12/2002 | Griffin et al. | 713/176 |
| 2004/0064457 A1 * | 4/2004 | Zimmer et al. | 707/100 |
| 2005/0138370 A1 * | 6/2005 | Goud et al. | 713/164 |
| 2005/0246552 A1 * | 11/2005 | Bade et al. | 713/193 |
| 2006/0020781 A1 * | 1/2006 | Scarlata et al. | 713/100 |
| 2006/0026419 A1 * | 2/2006 | Arndt et al. | 713/150 |
| 2007/0300069 A1 * | 12/2007 | Rozas | 713/176 |
| 2008/0141024 A1 * | 6/2008 | Ranganathan | 713/155 |
| 2008/0229097 A1 * | 9/2008 | Bangerter et al. | 713/155 |
| 2009/0178138 A1 * | 7/2009 | Weiss et al. | 726/22 |
| 2009/0204964 A1 * | 8/2009 | Foley et al. | 718/1 |
| 2010/0318786 A1 * | 12/2010 | Douceur et al. | 713/155 |
| 2011/0087872 A1 * | 4/2011 | Shah et al. | 713/2 |

OTHER PUBLICATIONS

TCG Specification Architecture Overview. Aug. 2, 2007. Trusted Computing Group Inc. Specification Revision 1.4.*

* cited by examiner

*Primary Examiner* — Nathan Flynn
*Assistant Examiner* — Michael R Vaughan
(74) *Attorney, Agent, or Firm* — Krishnendu Gupta; Gerald P. Kazanjian

(57) ABSTRACT

A software trusted platform module (sTPM) operates in a hypervisor, receives trust assurances from specialized hardware, and extends this trust such that the hypervisor performs trust attestation. The hypervisor receives a startup sequence validation from a TPM, or Trusted Platform Module. The TPM performs bus monitoring during a boot sequence of the computer system, records the startup sequence from the bus, and performs a hash on the sequence. The TPM performs an authentication exchange with the hypervisor such that the hypervisor authenticates the attestation of the computer system from the TPM, and the hypervisor, now delegated with trust assurances from the TPM, provides assurances to users via an authentication chain. The ATCB then performs the attestation of the computer system according to the attestation protocol much faster than the TPM. In this manner, the hypervisor operates as a software delegate of the TPM for providing user assurances of trust.

19 Claims, 7 Drawing Sheets

SOFTWARE TRUSTED COMPUTING BASE

BACKGROUND

Increased proliferation of the Internet in recent decades has spawned a corresponding increase in potential avenues through which undesirable and malicious software may propagate. Collectively called "malware," such undesirable software entities reside anonymously on host computers to covertly perform their designated task, such as gathering usage patterns, transmitting personal user data, or simply performing malicious corruption of data. Once employed as stand-alone number crunchers for the scientifically and mathematically gifted, modern computers are typically interconnected via the Internet and other networks, facilitating automatic and widespread transmission of data and executable entities (programs) in a manner ripe for exploitation by unscrupulous users.

Many computer users proactively employ security products designed to scan, detect, and prevent malware on their own systems. However, conventional computers each individually employ specific countermeasures, so it can be difficult to assess the existence of malware on an unfamiliar computer absent specific knowledge of the countermeasures in force. One emerging area that highlights concerns over assuring the absence of malware, or so called "trusted" nature of computer systems, is so-called grid computing. In a grid computing environment, computing resources are pooled and allocated to the grid users according to a resource management scheme. Typically, subscribers to such a grid environment receive CPU processing time on a fee-for-services basis. The grid manages available computers as a set of CPU resources, and allocates available computers to meet user requests. Often, such requests are CPU intensive tasks that may require multiple CPUs of the grid environment. Accordingly, a user of such a grid has little control over the trustworthiness of the computer systems to which a particular request is delegated.

SUMMARY

In a grid computing environment, a resource manager allocates user demands for computing services to available gird computers based on a resource allocation metric. Such a grid system pools an available set of grid computing resources, and the resource manager allocates the requests to the grid computing resources based on factors such as job size, CPU intensity, and completion time. User requestors typically have little control over the actual grid computers invoked for servicing the request. Unfortunately, therefore, conventional grid environments suffer from the shortcoming that a user in a conventional grid receives little assurance that an invoked grid computer is "trusted," or free from malware. Therefore, a grid user may be constrained by the resource allocation metric in use, which typically specifies parameters of speed and duration, and may be lacking in security assurances.

Certain computer systems are configured with specialized hardware for monitoring a startup, or boot, sequence, and providing assurances to a user via a cryptographic exchange. In such systems, a user issues a challenge, and the computer system response with an attestation of trust according to an attestation protocol, which ensures that the computer system has not been compromised during startup. However, such conventional attestation protocols suffer from the shortcoming that the specialized hardware providing the assurances tends to be slow, and may not be efficient at providing attestation to a number of users such as may be required in a grid environment.

Accordingly configurations herein substantially overcome such shortcomings by providing an Active Trusted Computing Base (ATCB) that extends the trust level from the trusted hardware, described further below. In the example configuration below, the ATCB operations are performed by a Software Trusted Computing Base (STCB) operating in a privileged manner on top of the TCB and responsive to bus activity in the TCB for providing the assurances described herein. In certain configurations, such as to address the shortcomings above, the ATCB may take the form of a trusted virtual machine manager (VMM), such as a hypervisor, that interfaces the requesting user to the computer system.

In the system servicing time, or runtime (following the boot sequence/startup), the ATCB runs directly on the hardware platform, and hence can manage memories and CPU registers of the hardware. It can mark a given memory location or given CPU registers to be read and/or write protected, and hence these parts cannot be read and/or modified by any other software/process. Since the ATCB runs directly on the hardware platform, it can mark, for a particular software process, a given memory location or given CPU registers to be read and/or write protected, and hence these parts cannot be read and/or modified by any software/process other than the marked process. Further, the activeness is not the marking action alone. It is its capability to intercept and stop an attempt to visit the marked area by any other processes, even though the attempt does not make any explicit request.

The trusted ATCB or hypervisor receives trust assurances from the specialized hardware, and extends this trust such that the hypervisor may perform the attestation to the user according to the attestation protocol. The ATCB, hypervisor, or other VMM, receives the result of a startup sequence validation from a TPM, or trusted platform module. In the example configuration, the TPM is the specialized hardware that performs bus monitoring during a boot sequence of the computer system, records the startup sequence from the bus, and performs a hash on the recorded sequence such that the hash is unlikely to be duplicated by a compromised system. The TPM performs an authentication exchange with the hypervisor such that the hypervisor authenticates the attestation of the computer system from the TPM, and the hypervisor, now delegated with trust assurances from the TPM, provides assurances to users via an authentication chain. The ATCB then performs the attestation of the computer system according to the attestation protocol much faster than the TPM. In this manner, the hypervisor operates as a software TPM, or sTPM, operable as a delegate of the TPM for providing user assurances of trust to the user via the attestation protocol. Since the TPM need only be validated as trusted once, and the authenticated attestation provided by the ATCB to the users multiple times, the TPM need not be burdened with fielding a multitude of attestations from requesting users of the computer system in a grid computing environment.

In other configurations, the disclosed arrangement need not be limited to a hypervisor or grid environment. The disclosed Software Trusted Computing Base (SCTB) may be implemented on any suitable computer system as an Active Trusted Computing Base (ACTB). Such an Active Trusted Computing Base operates in conjunction with the TPM such that it actively intercepts and is responsive to bus activity in enforcing the trusted environment, in contrast to a passive approach in which the TPM is command driven.

Any suitable hardware computing platform can be made into a Trusted Computing Base (TCB) as disclosed and claimed herein. An important and practical method to implement a TCB is to add a Trusted Platform Module (TPM) to the motherboard of a computing platform. A TPM, as discussed above, is a tamper-resistant chip containing physically protected cryptographic capability which cannot be easily affected by an external attempt to achieve an intelligible result. Such tamper-resistance refers to the physical ability to resist all but a brute force damaging attack which damages the serviceability of the TPM and hence is considered as a denial of service (DOS) attack In an example arrangement, the mounting point of the TPM in the platform is on a deep bus, or so called Low Pin Count (LPC) bus, a feature that provides for the TPM to be able to "measure" (discussed further below) the software loading from the very beginning of the platform power on time. Connected to the LPC bus, while being capable of measuring software, a conventional TPM is a passive entity in the servicing time of the platform, in that, it cannot sense any action or effect from any software. In particular the TPM cannot detect a malicious use of the software. Therefore, in conventional arrangements, the TPM/TCB design is a passive entity. In the servicing time of the platform, a passive TPM/TCB can only function in reacting to an explicit request from the other entity, such as responding to a user request for the TPM to participate in a protocol execution with the user. In contrast to the active TCB (ATCB) hardware platform discussed below, a conventional passive TPM/TCB cannot detect subtle attacks on software, applications or the system.

In further detail, the method of attesting to a trust level of a network environment platform such as the example grid server defined herein includes establishing a trust level of a trusted computing base (TCB), such that the trust level is verifiable by an attestation function invokable by a user via a challenge. Such a challenge returns an authentication of the TCB to confirm the established trust level. The claimed method extends the trust level to an ATCB coupled to the TCB for intercepting user requests to invoke the TCB, such that the ATCB is responsive to the challenge. The trusted computing base then responds to the challenges via the ATCB using the extended trust level, in which the challenges employing an attestation protocol for returning an attestation value based on the attestation function, the attestation value indicative of the trust level.

In the example configuration shown, establishing the trust level by generating the attestation value further includes recording a sequence of instructions executed by the TCB during a boot sequence, computing a hash value on the sequence of instructions, comparing the computed hash value to a known value indicative of a trusted environment, the known value being unlikely to result from a compromised environment. The TCB records the sequence of instructions by observing, from a trusted platform module (TPM) in communication with a hardware bus in the TCB, instructions sent over the hardware bus during the boot sequence. The TPM then signs, using a credential specific to the TPM, the computed hash value, such that the signed, computed hash value provides assurances of the trust level according to the attestation protocol. The TCB extends the trust level to the ATCB using public key techniques by authenticating the recorded boot sequence at the TCB using a credential indicative of the TCB, validating the recorded boot sequence at the ATCB, and authenticating the recorded boot sequence using a credential of the ATCB, such that the authenticated, recorded boot sequence is retained for responding to attestation challenges.

In the particular example configuration depicted herein, validation occurs via a public key infrastructure, or PKI, as is known in the art. Alternate mechanisms for validating, or authentication, trust indications may be employed in alternate configurations. In such a PKI, parties employ a credential issued by a trusted third party, typically known as a certificate authority (CA). The CA issues a certificate including the credentials of an entity, typically a public/private key pair in the disclosed PKI. Such credentials in cryptography establish the identity of a party to communication. Usually they take the form of machine-readable cryptographic keys and/or passwords. Cryptographic credentials may be self-issued, or issued by a trusted third party; in many cases the only criterion for issuance is unambiguous association of the credential with a specific, real individual or other entity. Cryptographic credentials are often designed to expire after a certain period, although this is not mandatory. An x.509 certificate, commonly employed in Internet transactions, is an example of a cryptographic credential.

Alternate configurations of the invention include a multi-programming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable storage medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM, RAM or PROM chips, field programmable gate arrays (FPGAs) or as an Application Specific Integrated Circuit (ASIC). The software or firmware or other such configurations can be installed onto the computerized device (e.g., during operating system execution or during environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

In the discussion that follows, an example grid environment suitable for use as an example network environment platform with the present invention is disclosed. In the network environment, user requests for grid computing are allocated to grid computer nodes, or servers. In contrast to conventional grid requests, an attestation exchange precedes invocation of the server on behalf of the user. The attestation exchange, discussed further below, includes a challenge on behalf of the user and an attestation by the trusted computing platform (platform, or TCP) indicative of the existence of a trusted computing environment on the platform. The disclosed attestation protocol defines the key exchanges employed for providing the trusted assurances to the user. While the grid computing environment is employed as an example for the attestation exchange by grid servers, other environments are also applicable to the attestation exchange. The example grid servers representing the trusted computing platform are example in nature, and the TCP may take other forms in an alternate trusted computing environment.

Figure 1:
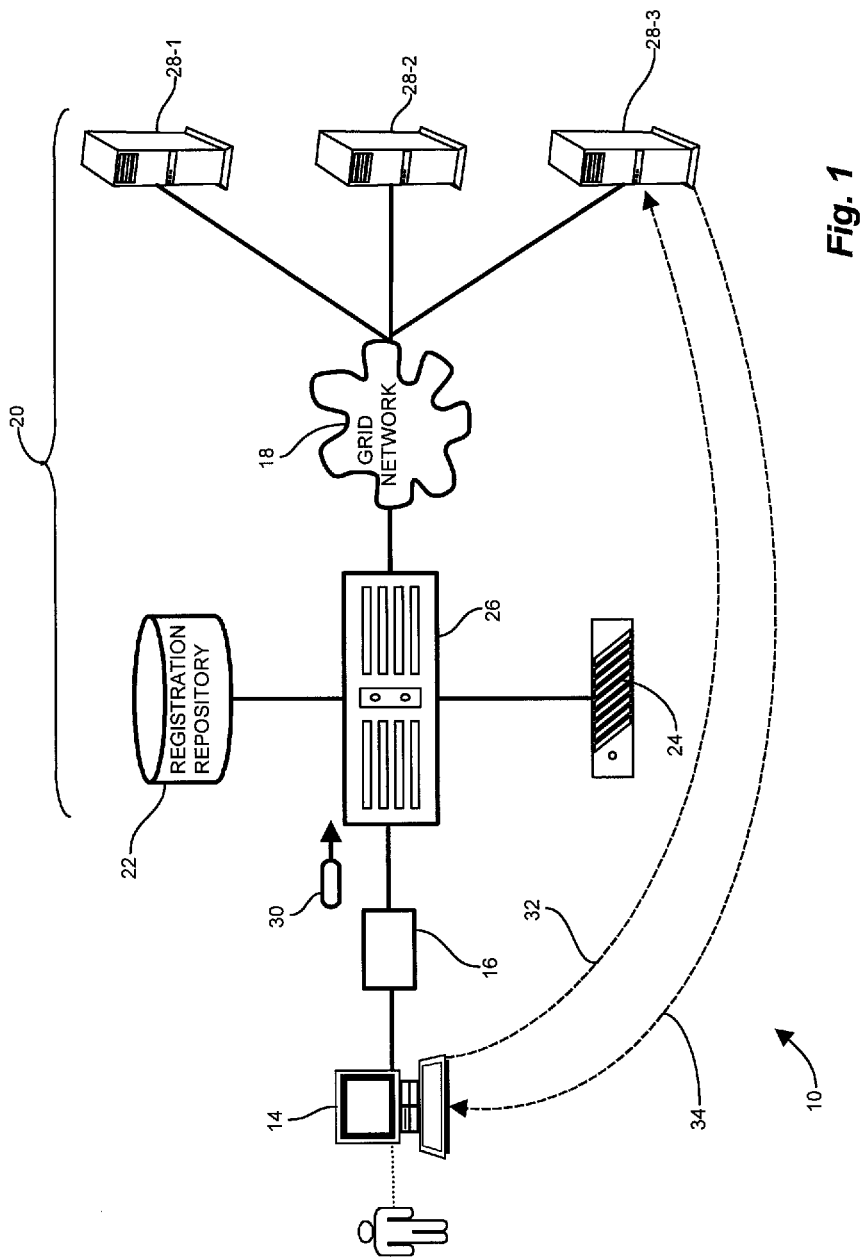
FIG. 1 is a context diagram of a grid computing environment suitable for use with the present invention.

FIG. 1 is a context diagram of an example grid computing environment suitable for use with the present invention. Referring to FIG. 1, in the grid computing environment 10, a user 14 accesses a grid environment 20 via a portal 16, which may be any suitable access point into the network 18 on which the grid resides 20. It should be emphasized that the disclosed grid 20 having grid servers 28 is an example of network environment platforms suitable for use with the disclosed method and apparatus. Various alternate deployments of network environment platforms employing the disclosed method and apparatus may be apparent to those of skill in the art. The grid 20 includes a registration repository 22, a domain manager 24, a job manager 26, and a plurality of servers 28-1 . . . 28-3 (28 generally). The registration repository 22 stores connectivity information about each user 14 and server 28 for establishing connections. The domain manager 24 monitors user access to the grid environment 20, and the job manager 26 allocates requests to grid resources, typically by assigning users 14, or user computing requests, to an appropriate server 28.

Each of the servers 28 is operable to receive a user request 30 for computing services. The domain manager 24 receives a user request 30, and invokes the registration repository 22 to identify the user 14 as a subscriber of grid services. The job manager 26 then identifies one or more gird servers 28 for providing the user 14 with computing services. In order for the user 14 to assure a trusted computing environment, the user issues a challenge 32 to the assigned server 28. The server 28 performs the corresponding attestation functions, discussed below, and returns an attestation 34 to the user. The attestation functions are part of the attestation exchange (32, 34) according to an attestation protocol between the user 14 and the server 28. The returned attestation 34 is digitally signed such that it is very difficult for an untrustworthy (i.e. malware infected) server 28 to return or emulate a proper attestation 34.

Figure 2:
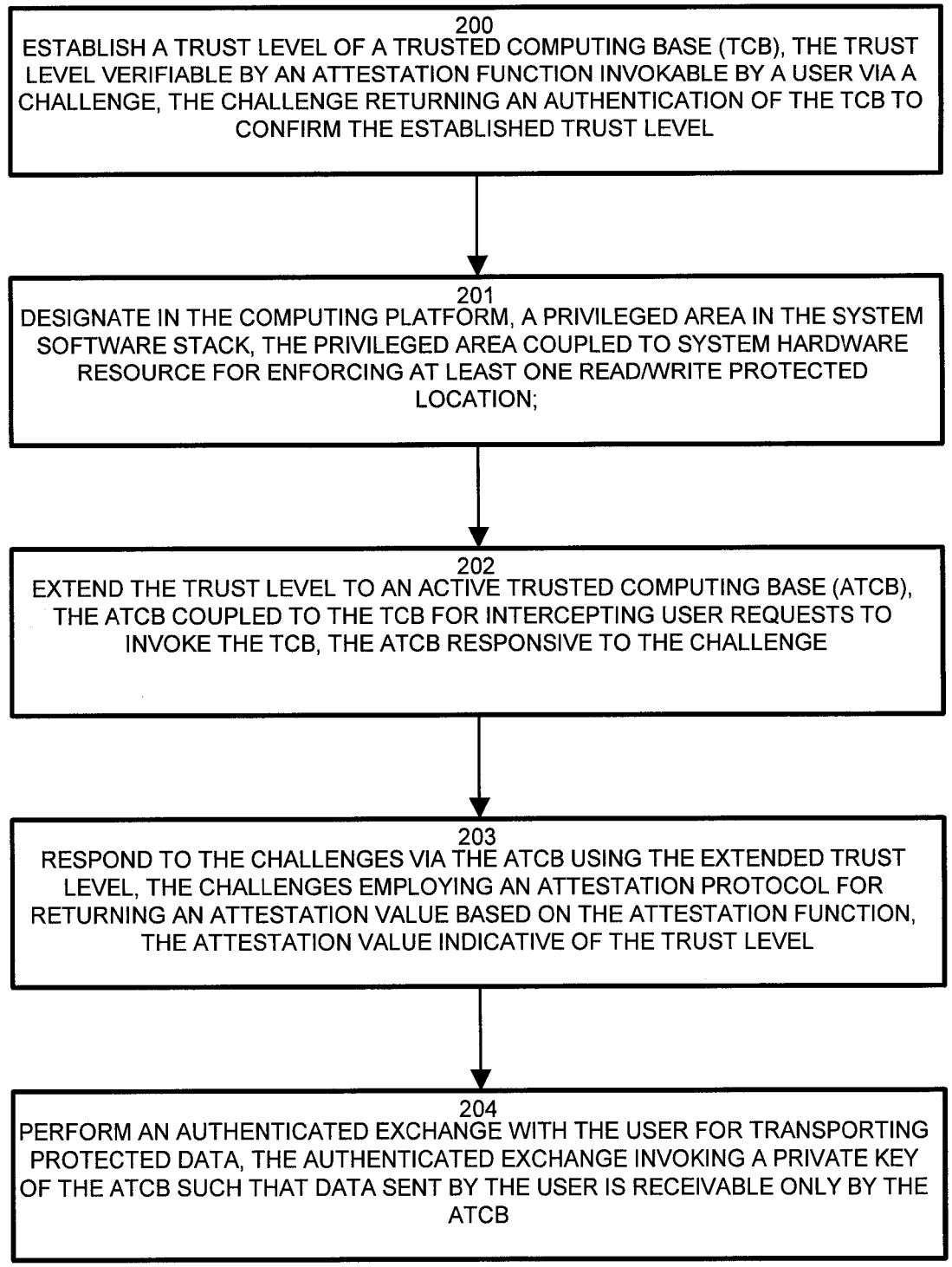
FIG. 2 is a flowchart of trust attestation of a grid computing node in the environment of FIG. 1.

FIG. 2 is a flowchart of trust attestation of a server 28 (grid node) in the environment of FIG. 1. Referring to FIGS. 1 and 2, the method of attesting to a trust level of a server 28 as disclosed herein further includes, at step 200, establishing a trust level of a trusted computing base (TCB), such that the trust level is verifiable by an attestation function invokable by a user via a challenge 32, in which the challenge returns an attestation 34 of the TCB to confirm the established trust level. The server 28 designates a privileged area 93 (FIG. 3, below) in the system software stack, such that the privileged area 93 is coupled to system hardware resources for enforcing at least one read/write protected location, as depicted at step 201. The TCB 70 includes the server 28 and a hardware trusted platform module 72 (TPM, FIG. 3, below), a specialized processor for validating and authenticating the hash value obtained from the startup sequence. The TCB 70 extends the trust level to an ATCB (80, FIG. 3 below), in which the ATCB 80 is coupled to the TCB 70 for intercepting user requests 30 to invoke the TCB 70, such that the ATCB 80 is responsive to the challenge 32 from the user 14, as depicted at step 202. The ATCB 80 executes in the privileged area 93, and thus has the capability to intercept and stop attempts to access the marked area by any other processes, even though the attempt does not make any explicit request. The ATCB 80 therefore receives the same trust level as the already attested to hardware platform, via the TPM 72, since the boot hash verified the startup phase and since no other process can modify the ATCB during the subsequent system servicing time (i.e. runtime).

The server 28 responds to the challenges via the ATCB 80 using the extended trust level, such that the challenges 32 employ an attestation protocol for returning an attestation value 34 based on the attestation function, in which the attestation value is indicative of the trust level, as shown at step 203. The attestation value 34 is compared with a known value that corresponds to a malware-free (trusted) boot sequence, and therefore effectively vouches for the particular server 28.

In particular configurations, The ATCB 80 further performs an authenticated exchange with the user for transporting protected data. The authenticated exchange invokes a private key of the ATCB 80 such that data sent by the user is receivable only by the ATCB, referred to below as StorKey. The StorKey exchange allows a user to securely exchange data with the platform 60 following attestation, as depicted at step 204.

Figure 3:
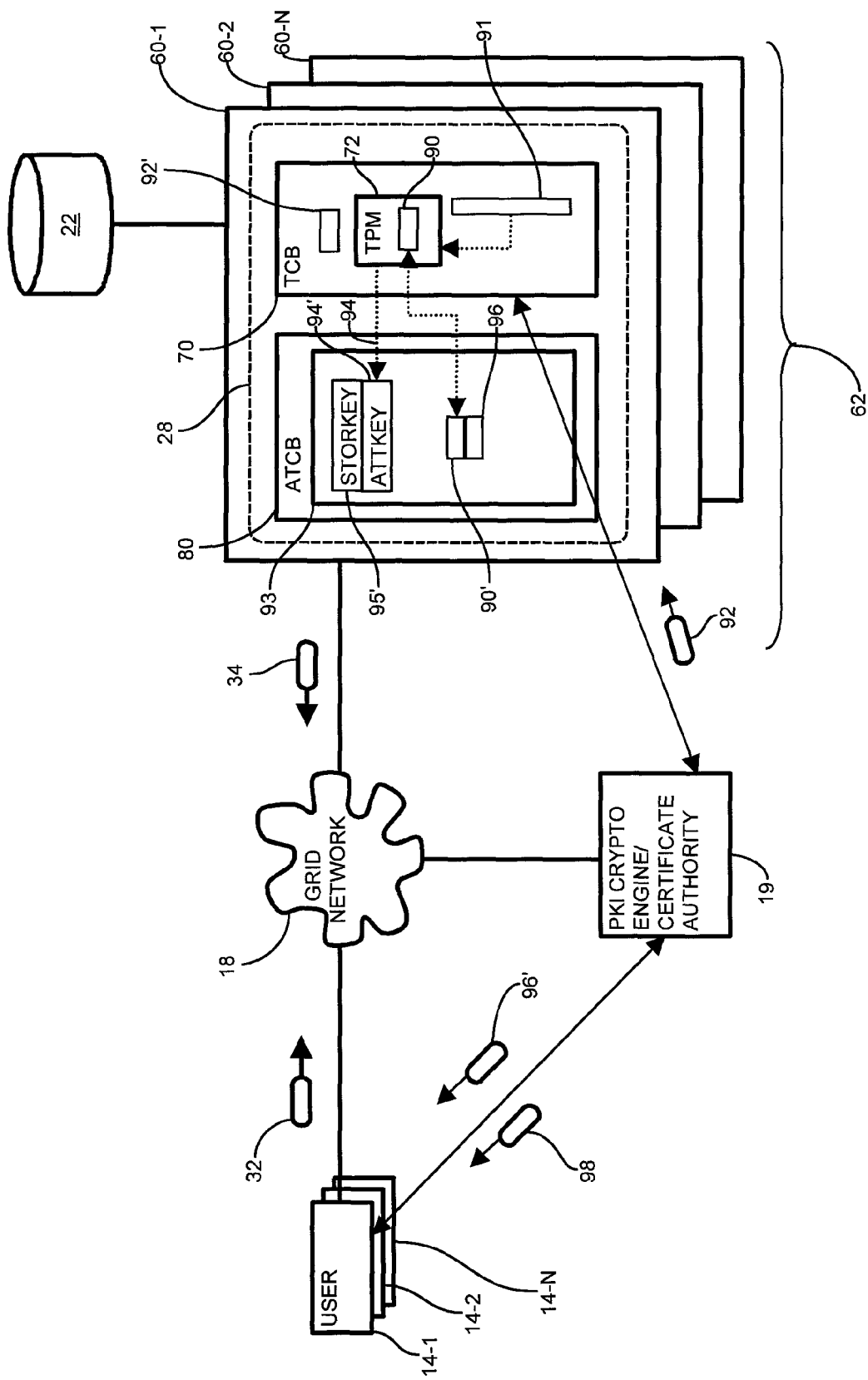
FIG. 3 is a block diagram of attestation according to the flowchart of FIG. 2.
Figure 4:
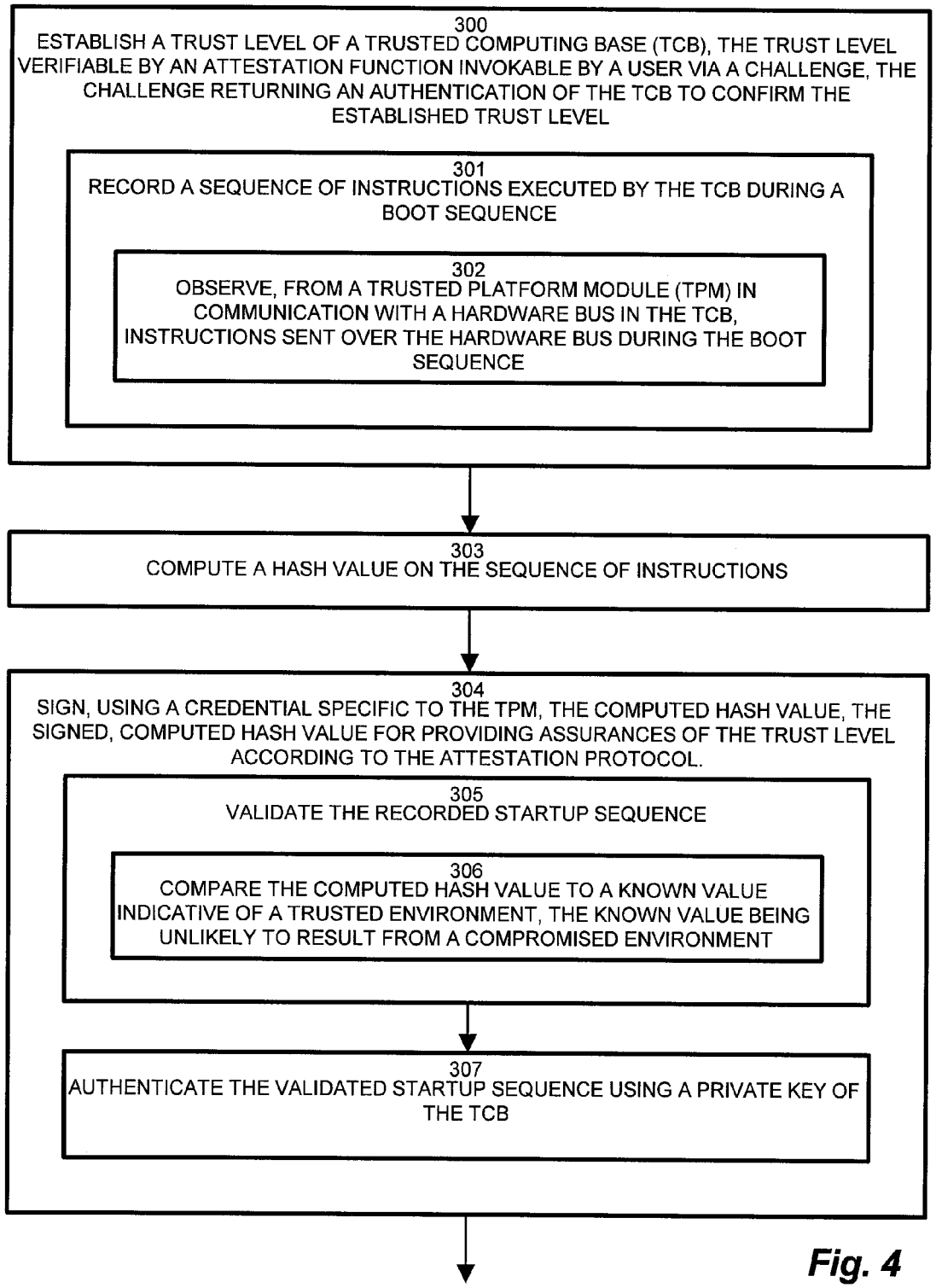
FIGS. 4-7 are a flowchart of an attestation protocol for validating a trusted computing base (TCB) in the system of FIG. 3.
Figure 5:
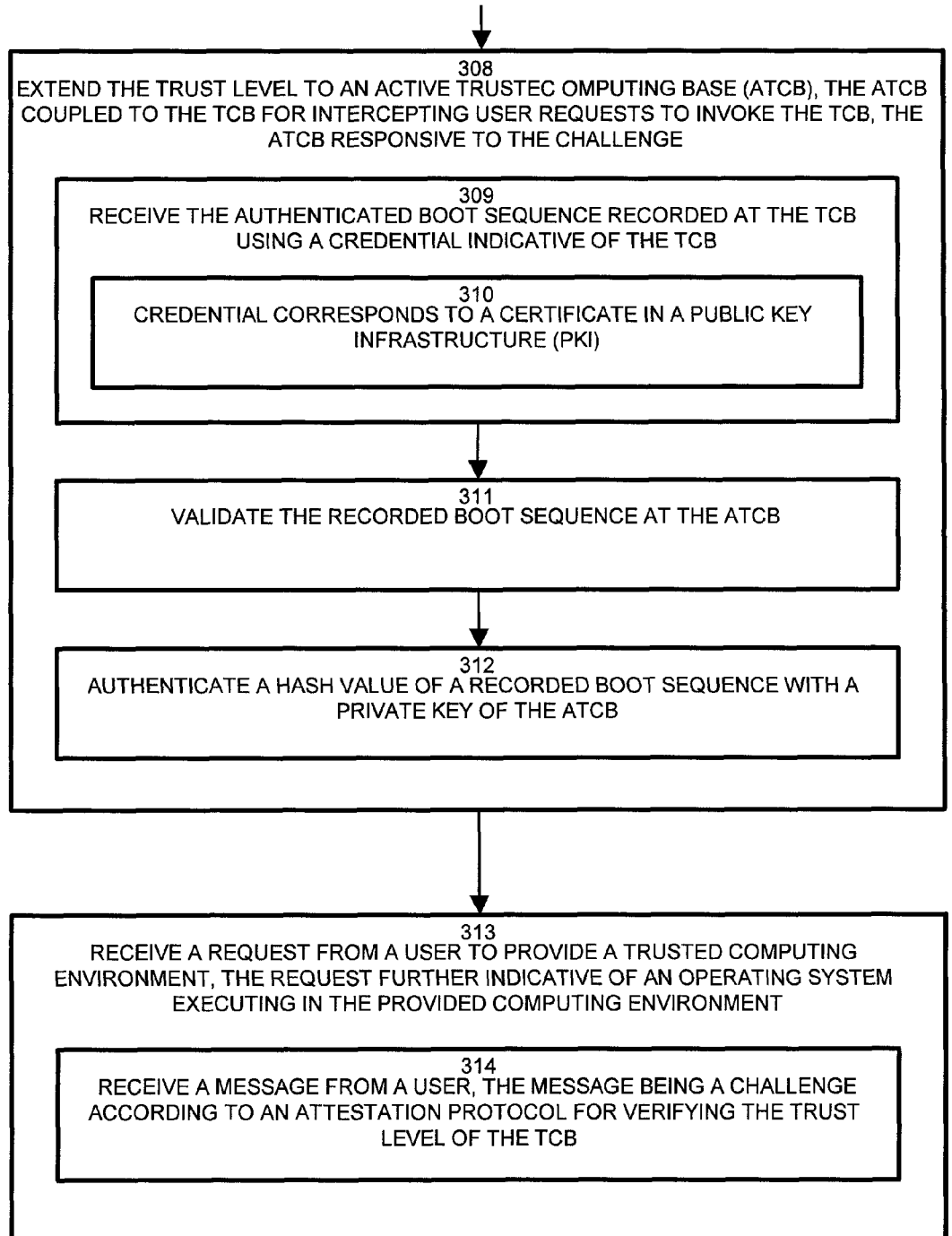
Figure 6:
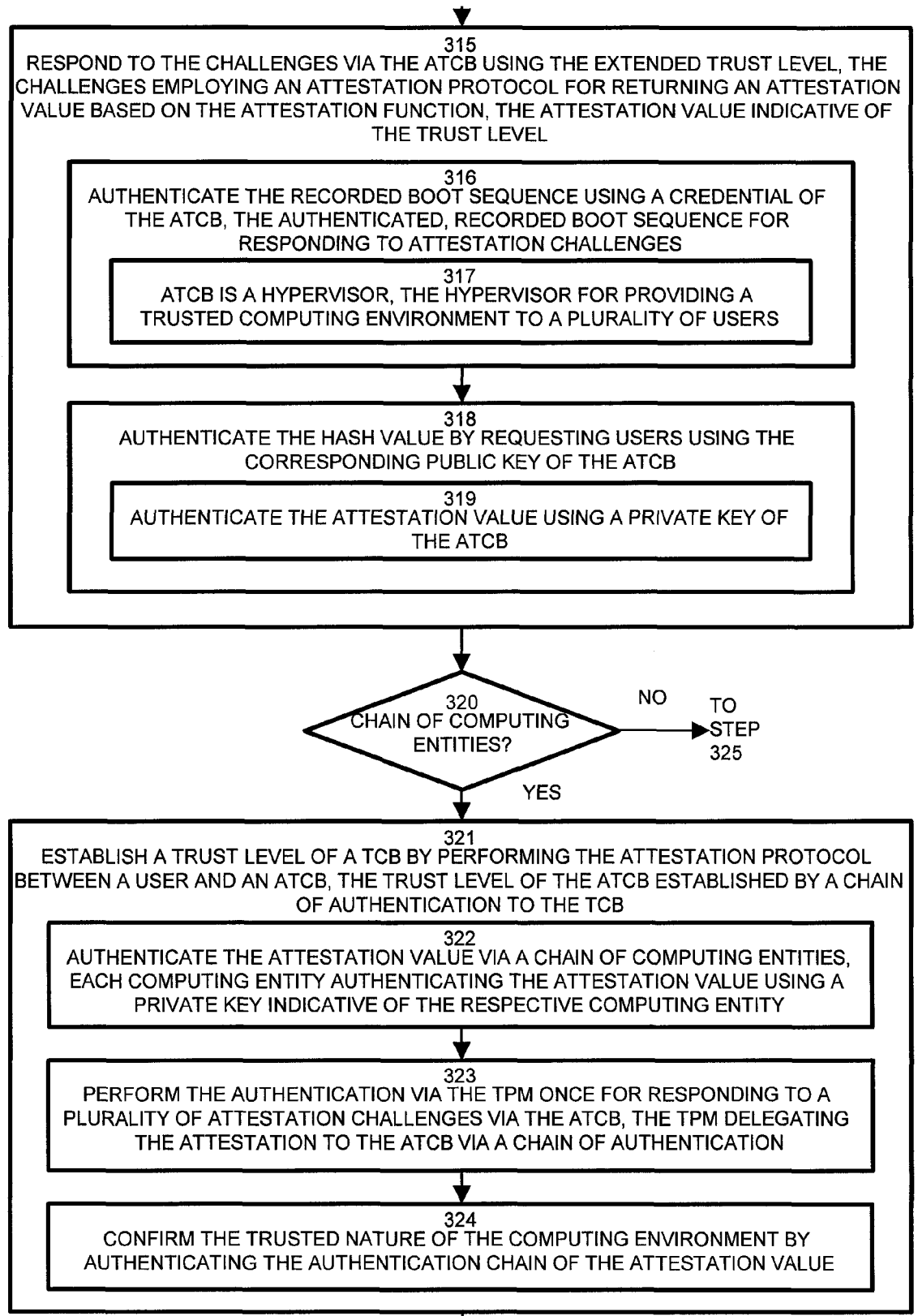
Figure 7:
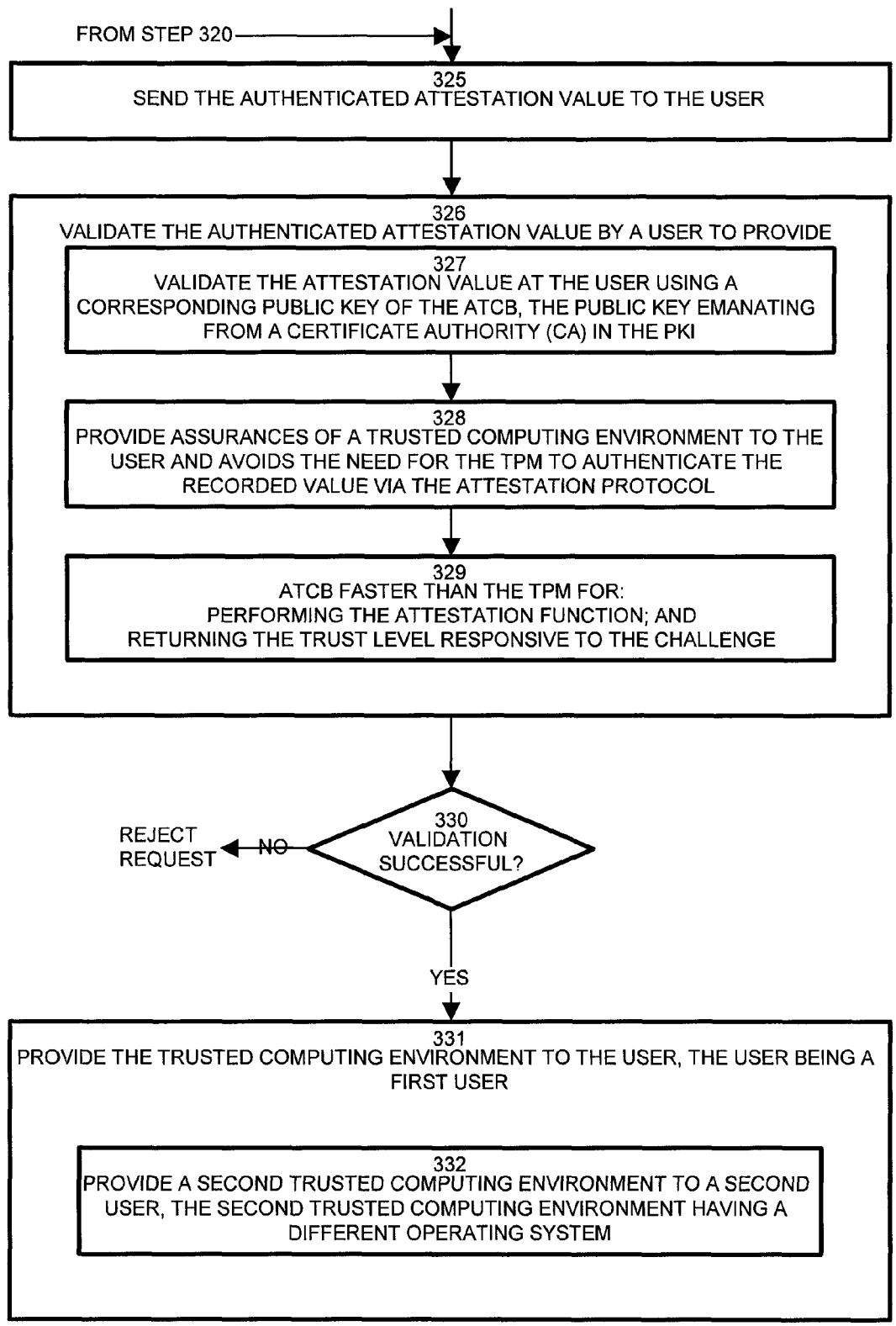

FIG. 3 is a block diagram of attestation according to the flowchart of FIG. 2. Referring to FIGS. 1 and 3, in the example grid computing environment 10 illustrated, the plurality of servers 28-N each define a trusted computing platform 60-1 . . . 60-N, including the server 28, interconnected to form the computing grid 62. The network 18, which may be any suitable interconnection medium such as the Internet, LAN, WAN, VPN or other similar arrangement, is invoked to establish communication between the user 14 and the invoked server 28, and includes a connection to a certificate authority (CA) and/or cryptographic engine 19 for providing credentials for authentication, discussed further below. Each Trusted Computing Platform (TCP) 60 includes a Trusted Computing Base (TCB) 70 having a Trusted Platform Module (TPM) 72. The trusted computing base 70 provides the CPU time for servicing the user requests 30, and the TPM 72 validates the boot sequence of the TCB 70 and ensures the trusted nature of the TCB 70. The TPM 72 watches bus accesses during the boot sequence, records the operations executed, and computes a boot hash 90 on the result for storage in local registers for subsequent validation by the ATCB 80. Thus, a properly executed boot sequence will generate the proper hash, however modifications to the boot sequence, such as would be caused by the presence of malware, will cause a different hash. However, since conventional challenges require the TPM 72 to perform substantial authentication processing, the TPM 72 may become overburdened with the conventional challenges 32. The TCP 60 also includes an ATCP 80, such as a hypervisor, that provides delegated attestation 34, now discussed in further detail.

The ATCB 80 may be, in the example configuration, a hypervisor operable for serving multiple users 14-N in a partitioned address space with a dedicated operating system (OS). The ATCB 80 includes a privileged area 93 in the system software stack having privileged registers accessible only to certain accesses from other processes running at a privileged, or kernel, level. In architectures that impose a so-called "layered" structure, the system software stack 93 is the next layer above the hardware, thus providing the most secure arrangement. This privileged area 93 therefore allows a trust level to be ascertained by the TPM 90 at bootstrapping time and ensured during ongoing servicing time (runtime) due to the access controls of the privileged area 93. Since the stack 93 runs as the next "layer" above the hardware/TPM 72, changes are unlikely to be made to the hypervisor without affecting the computed boot hash 90 resulting from the boot sequence. The TPM 72 signs the computed boot hash 90 using a private key 92' in a credential 92 generated from any suitable cryptographic engine, such as the CA 19. The hypervisor 80 stores a signed boot hash 90' upon signing of the computed boot hash 90 by the TPM 72, and maintains the stored, signed boot hash 90' for providing assurances to users 14 of the trusted boot sequence on behalf of the TPM. The hypervisor 80 also receives a private key 94' shown by arrow 94 from the TPM 72, and stores the private key 94' (AttKey) for authenticating the attestation 34 issued to requesting users. A second key 95' (StorKey) may be employed in successive exchanges for receiving encrypted data from the user 14 for storage in the database 22 or other processing. The TPM 72 therefore performs the functions of a certificate authority for providing the attestation 34 to the users 14. Upon receiving a challenge 32, the hypervisor signs the stored boot hash 90' to generate an ATCB signature 96, thus providing assurances that the TPM created hash 90 emanated from the hypervisor 80. The resulting attestation 34, containing signatures from both the TPM 72 and the ATCB 80, is sent to the requesting user 14, thus attesting to the trusted nature of the hypervisor 80 provided computing environment. The receiving user 14 may then authenticate (i.e. validate the authenticity of) the boot hash 72 using the CA 19 published public key of the TPM 98 and of the ATCB 96', according to public key techniques employed throughout the PKI in use in the grid computing environment 10. The hypervisor 80 repeats this attestation for each user 14 requesting a trusted computing environment via an assigned TCP 60.

Configurations herein are particularly beneficial in the context of the hypervisor 80 because the hypervisor accommodates multiple users 14, each of whom expects to receive an attestation 34. In contrast to a single user system, where such an attestation 34 might be expected only once per day, the hypervisor 80 context that provides multiple logins is hampered when a conventional TPM 72 is burdened with repetitive attestations 34.

FIGS. 4-7 are a flowchart of an attestation protocol for validating a trusted computing base (TCB) 70 in the system of FIG. 3. Referring to FIGS. 3-7, as in the previous example of FIG. 2, the method of attesting to a trust level of a server 28 establishes a trust level of a trusted computing base (TCB) 70, such that the trust level is verifiable by an attestation function invokable by a user 14 via a challenge 32 that returns an authentication 34 of the TCB 70 to confirm the established trust level, as depicted at step 300. This includes recording a sequence of instructions executed by the TCB 70 during a boot sequence, as shown at step 301 Recording the sequence of instructions involves observing, from a trusted platform module 72 (TPM) in communication with a hardware bus 91 in the TCB 60, instructions sent over the hardware bus 91 during the boot sequence, as shown at step 302.

The TPM 70 computes a hash value on the sequence of instructions executed during the boot sequence, as depicted at step 303. An uncorrupted boot sequence should repeatedly execute the same instruction sequence. Thus, gathering the values of the instructions by observing the bus 91 should result in the same value on each successive reboot. A deviation from this value indicates possible corruption. A hash 90 computed on the observed boot sequence is validated against a known uncorrupted hash to establish that a trusted (uncorrupted) boot sequence has been executed.

To ensure an untampered hash value 90, the TPM 72 signs the computed hash value using a credential 92 specific to the TPM (typically a private key half 92' of a public key pair). The resulting signed, computed hash value 90' is for providing assurances of the trust level according to the attestation protocol, as shown at step 304. The attestation protocol, as indicated above, is employed by the users 14 of the servers 28 for performing attestation challenges 32 and receiving attestation responses 34 ensuring the trusted nature of a particular computing base 60. Responding to the challenges 32 includes validating the recorded startup sequence, as shown at step 305, by comparing the computed hash value 90 to a known value indicative of a trusted environment, such that the known value is unlikely to result from a compromised environment, as depicted at step 306. Having validated the trusted startup sequence, the TPM 72 digitally signs the validated startup sequence using the private key 92' of the TPM 70, as shown at step 307.

Having validated a secure, or trusted, startup via the TPM 72, the TCB 70 effectively "reuses" such a validation of the trust level in multiple attestation responses 34 to users 14. The TPM 72 extends the trust level to an ATCB 80 coupled to the TCB 70 for intercepting user requests to invoke the TCB, such that the ATCB 80 is responsive to the challenge 32 in lieu of the TPM, as depicted at step 308. Extending the trust level further includes, at step 309, receiving, at the ATCB 80, the recorded boot sequence 90' from the TCB 70 signed using a credential (i.e. key) indicative of the TCB 70, such as the private key of the TPM 92'. In the example arrangement, the credential corresponds to a certificate 92 in a public key infrastructure (PKI). The PKI includes multiple certificate authorities 19 that distribute certificates to users for encryption and authentication. As is known in the art, a certificate issued by the CA corresponds to a key pair. The user/holder to whom the key is issued maintains a private portion in secret, and the public portion is published by the CA 19 for use by entities with whom the user 14 corresponds.

In preparation for receiving a challenge 32, the ATCB 80 validates the recorded boot sequence 90 at the ATCB 80, as disclosed at step 311. This means that the ATCB 80 verifies the authenticity (i.e. origin) of the startup hash 90 as being from the TPM 72 by using a public key of the TPM's key pair to decrypt the recorded boot hash 90 encrypted with the private key of the TPM 72, thus confirming that the TCB 70 represents a trusted computing base because the recorded, signed boot hash 90' emanated from the TCB 70.

Having received and validated the hash value 90', the ATCB is in a position to attest to the trust level of the TCB. It does this by signing the hash value 90' of the recorded boot sequence 90 with a private key 94' of the ATCB, as depicted at step 312. The TPM 72 functions as a certificate authority, and provides the private key 94 for validating the attestation value sent to users 14. Key pairs including the private key 94 may emanate from any suitable source, such as an external cryptographic engine 19 or CA, depending on an available public key infrastructure (PKI). Users 14 requesting an attestation 32 may now receive the boot hash 90', signed by the ATCB 80, and authenticated using the ATCB public key 98, available to users via the CA 19. In effect, the ATCB 80 "trusts" the TPM 72, and the user 14 "trusts" the ATCB 80, creating a chain of trusted entities. Such an authentication chain may also include additional trusted entities, discussed further below.

At a subsequent time, the ATCB 80 receives a request 30 from a user 14 to provide a trusted computing environment, as depicted at step 313. Such a request 30 is further indicative of an operating system executing in the provided computing environment, as the ATCB 80 is a hypervisor operable to provide multiple users 14 with an OS independent environment, as opposed to conventional multiprogramming systems which support multiple users from a single OS environment. Responding to the challenge by the ATCB 80 includes receiving the message 30 from a user 14, in which the message includes or is accompanied by a challenge 34 according to the attestation protocol for verifying the trust level of the TCB 70, as depicted at step 314. The user 14 of the grid computing environment 10 expects an attestation 34 of the secure (trusted) nature of a particular TCB 70 in the trusted computing platform 62 before committing any computing tasks.

The server 28 responds to the challenges 32 via the ATCB 80 using the extended trust level designated by the authenticated hash 90', as depicted at step 315. Such challenges 32 employ the attestation protocol for returning an attestation value 34 based on the attestation function, such that the attestation value is indicative of the trust level. The ATCB 80 authenticates the recorded boot sequence 90' using a credential 96 of the ATCB 80, in which the authenticated, recorded boot sequence is for responding to attestation challenges 32 via the attestation response message 34, as shown at step 316. In the example arrangement, the ATCB 80 is a hypervisor for providing a trusted computing environment to a plurality of users 14-N, as shown at step 317. Other arrangements may be envisioned, as the ATCB need not be a hypervisor. Such a hypervisor, however, typically receives multiple attestation requests 32 from various users 14, thus the efficiency of the software TPM effected by ATCB 80 attestation 34 is particularly beneficial, as otherwise the TPM 72 would be burdened with multiple attestation requests, each requiring digital signatures, a computationally expensive exchange for the TPM 72.

The ATCB 80 digitally signs the attestation value (i.e. TPM authenticated hash) 90' of the TCB using a credential indicative of the ATCB 94', sends it to the requesting user as an attestation value 34, and the receiving user 14 authenticates the hash value 90' using the corresponding public key 96' of the ATCB 80, provided by the CA 19 or from other sources, as defined in the PKI infrastructure, as shown at step 318. The ATCB public key 96' is thus a credential the corresponds to a key pair (96, 96') in a public key infrastructure (PKI), and is operable for authenticating the attestation value 90' that was encrypted using the private key 96 of the ATCB 80, as shown at step 319. In the example configuration shown, the TPM 72 is operable to act as a CA 19. The public key of the ATCB can be certified by the TPM 72. The TPM 72 is certified by a CA 19. So the user 14 validates the certification of the public key of the VMM and the certification of the TPM 72.

In particular configurations, an extended chain of authenticating entities may be employed. In such a configuration, the authenticated hash value 90 traverses entities other than the TPM 90, ATCB 80, and user 14. In the case of an authentication chain, each successive entity "vouches" for, or attests to, the trusted nature of the entity preceding it in the chain. Accordingly, a check is performed, at step 320, for a chain of computing entities. Accordingly, the trusted computing base 70 establishes the trust level of the TCB 70 by performing the attestation protocol between a user and a ATCB, such that the trust level of the ATCB is established by a chain of authentication to the TCB 70, as depicted at step 321. Such a chain may be viewed simply as a further extension of the attestation provided to the ATCB 80 by the TPM 72, as discussed above. Validating the recorded boot sequence further includes authenticating the attestation value 90 via a chain of computing entities 28, such that each computing entity 28 authenticates the attestation value 90 using a private key 92' indicative of the respective computing entity 28, as disclosed at step 322. Thus, the platform 60 performs the authentication via the TPM 72 once for responding to a plurality of attestation challenges 32 via the ATCB 80, such that the TPM 72 delegates the attestation to the ATCB 80 via a chain of authentication, as depicted at step 323. Challenging users 14 confirm the trusted nature of the computing environment provided by the TCB 70 by authenticating the authentication chain of the attestation value 90, as shown at step 324. As each authenticating entity 28 has encrypted (i.e. signed) the attestation value 90 with their private key, the validating user 14 decrypts using the CA 19 published public key of the respective entity.

The authenticated attestation value is sent to the user 14 as an attestation response 34, as shown at step 325. The receiving user validates the signed attestation value 90 to provide assurances of the trusted computing environment of the TCB 70, as depicted at step 326. Validation includes validating the attestation value 90 at the user 14 using a corresponding public key 98 of the ATCB 80, in which the public key emanates from the certificate authority (CA) 19 in the PM, as shown at step 327. Authentication by the ATCB 80 thus provides assurances of a trusted computing environment to the user 14 and avoids the need for the TPM 72 to authenticate the recorded value via the attestation protocol, as shown at step 328. Attestation in this manner is beneficial because the ATCB 80 is faster than the TPM 72 for performing the attestation function and returning the trust level 34 (attestation response) responsive to the challenge 32, as depicted at step 329. Since the ATCB 80 can effectively service multiple attestation challenges 32 more efficiently than the TPM directly, is particularly beneficial in a hypervisor environment where many users are requesting a trusted computing platform 60 and require an accompanying attestation response 34.

A check is performed to determine if the validation of the attestation response 34 is successful, as depicted at step 330. If the validation is successful, indicating the trusted (i.e. malware free) computing environment at the TCP 60, the TCP provides the trusted computing environment to the user 14, as shown at step 331. Further, since the hypervisor provides multiple OS independent environments, the TCP may provide a second trusted computing environment to a second user, the second trusted computing environment having a different operating system, as depicted at step 332, also via the attestation protocol discussed above.

Configurations herein define an Active TCB (ATCB) 80 as any suitable computing platform operable to receive the TPM 90 and having a system software stack 93 operable for operation at a privileged level for enforcing access protection. In further detail, in such a suitable computing platform, the ATCB 80 disclosed above is a software TCB executing in the system software stack 93 at a privileged, sometimes called kernel, level. The TPM 72 performs a "measurement" by recording bootstrapping instructions, and authorizes the ATCB 80 by certifying a hash value 90 indicative of a valid (malware free) boot. The ATCB is then "authorized" to attest to the trusted nature of the platform 28, and may perform trusted storage operations via a protected storage protocol between the user and the attested (trusted) platform 28, as outlined below.

1) Active TCB (ATCB):

An Active TCB (ATCB) in the realization described in this invention is a software component that has the following properties:

- In the system bootstrapping time, the loading of the ATCB involves the following two steps: (i) the TPM measures the ATCB (this is defined in Section 2 below), and (ii) the TPM authorizes the ATCB (this is defined in Section 3 below).
- Upon load in the memory, the TCB becomes the software root of trust. In the rest of the system servicing time, the role of the ATCB will include to execute two important functions of the TPM: (i) remote attestation (this is defined in Section 4) and (ii) protected storage (this is defined in Section 5 below). The ATCB will perform these two operations on behalf, and without active involvement, of the TPM.
- In the system servicing time, the ATCB has the highest privilege in the entire system servicing software stack. Thus, if the ATCB code in the memory is set to be write protected, then no other software can modify the code, and if the data part of the ATCB in the memory is set to be read and/or write protected, then no other software can read and/or modify the data part of the ATCB.
- In the system servicing time, the ATCB runs directly on the hardware platform, and hence can manage memories and CPU registers of the hardware. It can mark a given memory location or given CPU registers to be read and/or write protected, and hence these parts cannot be read and/or modified by any other software/process.
- In the system servicing time, the ATCB will interpose between other software above it, and the hardware below it. This means that any use of the system hardware resource by other software must go through the active management of the ATCB.
- A virtual machine monitor (VMM), a hypervisor, or a micro-kernel are considered to be, not exclusively, suitable embodiments of an ATCB. In these embodiments, the ATCB will "trap" any other software's uses of the hardware resource. Thus, the ATCB is an active entity with respect to the executing code.

2) The TPM/TCB Measurement of the ATCB:

In the system bootstrapping time, the TPM enabled TCB can measure the ATCB code. This is achieved in the following steps:

- The TPM computes a hash value of the ATCB's code.
- The TPM certifies the hash value by digitally signing the value.
- The TPM sends the certified hash value, called the measurement of the ATCB, to the ATCB.

The ATCB places the measurement of the ATCB, as part of its data, in a write protected (marked) memory location.

3) The TPM/TCB Authorization of the ATCB:

The procedure for the TPM/TCB to authorize the ATCB is as follows.

- The ATCB generates a random asymmetric attestation key pair. This attestation key pair, denoted AttKey, will be used in the attestation protocol. The public key of AttKey is certified (digitally signed) by the TPM. We use attestation certificate to denote this certified public key of AttKey. The ATCB places the private key of AttKey, as part of its data, in a read/write protected memory location.
- The ATCB generates a random asymmetric storage key pair. This storage key pair, denoted StorKey, will be used for securing confidential data (to be defined below). The public key of StorKey is certified (digitally signed) by the TPM. We use storage certificate to denote this certified public key of StorKey. The ATCB places the private key of StorKey, as part of its data, in a read/write protected memory location.

4) Attestation Protocol between the ATCB and a User:

The procedure for the ATCB to attest itself to a user is as follows.

- The user and the ATCB agree on a data X to be the output of the attestation.
- The User sends to the ATCB a random number.
- The ATCB receives the random number.
- The ATCB digitally signs the random number together with X using the private key of AttKey, and sends the result back to the user. The ATCB also sends the attestation certificate (defined in section 3) and the TPM certificate (certified by a Trusted Third Party, not covered in this invention) to the user.
- The user receives the signed random number, the attestation certificate and the TPM certificate from the ATCB.
- The user verifies the digitally signed random number using the public key of AttKey.
- The user validates the public key of AttKey by verifying the attestation certificate.
- The user validates the attestation certificate by verifying the TPM certificate. If each of the verifications in step (6)~(8) passes, the user accepts the attestation; otherwise, the user rejects the attestation. From an acceptance run of the attestation protocol, data X is called the acceptance output of the attestation protocol.

5) Protected Storage Protocol between the ATCB and a User:

Suppose a user wants the ATCB to secure the confidentiality quality of data Y. The procedure for this protected storage is as follows.

- The user and the ATCB run the attestation protocol (in section 4) for the ATCB to attest to the user. The user and ATCB agree that the acceptance output of the attestation protocol be the validity of the public key of StorKey.
- Upon acceptance the attestation, the user obtains the valid public key of StorKey.
- The user encrypts Y using the public key of StorKey, and sends the encrypted result to the ATCB.

The encrypted data can be decrypted by the ATCB using the private key of StorKey.

Those skilled in the art should readily appreciate that the programs and methods for attesting to a trust level of a computing environment as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example as in an electronic network such as the Internet or telephone modem lines. Such delivery may be in the form of a computer program product having a computer readable storage medium operable to store computer program logic embodied in computer program code encoded thereon, for example. The operations and methods may be implemented in a software executable object or as a set of instructions embedded in an addressable memory element. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for attesting to a trust level of a computing environment has been particularly shown and described with references to embodiments thereof, it will be understood by those skilled in the art that various changes in form and details may be made therein without departing from the scope of the invention encompassed by the appended claims.

What is claimed is:

1. A method of attesting to a trust level of a computing platform in network environment comprising:
   establishing a trust level of a trusted computing base (TCB) in the computing platform, the trust level verifiable by an attestation function invokable by a user via a challenge, the challenge returning an authentication of the TCB to confirm the established trust level, the TCB having a privileged area in a system software stack operable for protected access;
   interposing an active trusted computing base (ATCB) in the privileged area, the privileged area being between a hardware platform and other software executing on the TCB, the ATCB actively intercepting attempts to access the privileged area;
   extending the trust level to the privileged area, the privileged area including the active trusted computing base, the ATCB coupled to the TCB for intercepting user requests to invoke the TCB, the ATCB responsive to the challenge;
   marking an attestation value as protected, the ATCB actively intercepting and stopping unexpected access attempts to the marked attestation value; and
   responding to the challenges via the privileged area using the extended trust level, the challenges employing an attestation protocol for returning the attestation value based on the attestation function, the attestation value indicative of the trust level;
   establishing the trust level comprising:
      recording a sequence of instructions executed by the TCB during a boot sequence as a recorded boot sequence;
      generating the attestation value by computing a hash value on the sequence of instructions;
      storing the computed hash in the privileged area; and
      comparing the computed hash value to a known value indicative of a trusted environment, the known value being unlikely to result from a compromised environment.

2. The method of claim 1 wherein recording the sequence of instructions further comprises:
   observing, from a trusted platform module (TPM) in communication with a hardware bus in the TCB, instructions sent over the hardware bus during the boot sequence; and
   computing the hash value of loaded software components and storing the computed hash values in a local TPM register, the computed hash value for providing assurances of the trust level according to the attestation protocol.

3. The method of claim 1 further comprising establishing a trust level of the ATCB by performing the attestation protocol between a user and the ATCB, the trust level of the ATCB established by a chain of authentication to the TCB.

4. The method of claim 1 wherein extending the trust level further comprises:
   digitally signing the recorded boot sequence at the TCB using a credential indicative of the TCB;
   validating the recorded boot sequence at the ATCB;
   storing the recorded boot sequence in the privileged area;
   digitally signing the recorded boot sequence using a credential of the ATCB, the signed, recorded boot sequence for responding to attestation challenges; and
   actively monitoring memory access to the privileged area, the ATCB receiving interrupts indicative of attempting to access the privileged area or the marked attestation value.

5. The method of claim 4 wherein the credential corresponds to a certificate in a public key infrastructure (PKI), extending the trust level of the TCB to the ATCB being performed by:
   digitally signing a hash value of the recorded boot sequence with a private key of the ATCB; and
   validating the hash value by requesting users using the corresponding public key of the ATCB.

6. The method of claim 5 wherein digitally signing by the ATCB provides assurances of a trusted computing environment to the user and avoids the need for a trusted platform module (TPM) to authenticate the recorded value via the attestation protocol.

7. The method of claim 5 further comprising performing the digitally signing via a trusted platform module (TPM) once for responding to a plurality of attestation challenges via the ATCB, the TPM delegating the attestation to the ATCB via a chain of authentication.

8. The method of claim 5 wherein the ATCB is faster than a trusted platform module (TPM) for:
   performing the attestation function; and
   returning the trust level responsive to the challenge.

9. The method of claim 4 wherein the extended trust level includes a chain of authentication between the user and a trusted platform module (TPM), further comprising:
   authenticating the attestation value via a chain of computing entities, the chain including at least a digital signature of the TPM and a digital signature of the ATCB, each computing entity authenticating the attestation value using a private key indicative of the respective computing entity; and
   confirming the trusted nature of the TCB by validating the signatures of each of the computing entities.

10. The method of claim 1 wherein responding to challenges further comprises:
    receiving a message from a user, the message being a challenge according to an attestation protocol for verifying the trust level of the TCB;
    digitally signing the attestation value of the TCB using a credential indicative of the ATCB; and
    validating the authenticated attestation value by a user to provide assurances of the trusted computing environment of the TCB.

11. The method of claim 10 wherein the credential corresponds to a key pair in a public key infrastructure (PKI), further comprising:
    digitally signing the attestation value using a private key of the ATCB;
    sending the authenticated attestation value to the user; and
    validating the attestation value by the user using a corresponding public key of the ATCB to confirm authenticity from the ATCB, and validating the certification of the attestation value by a trusted platform module (TPM), and concluding the trusted nature of the TCB from the certification of the public key of the ATCB and the certification of the TPM.

12. The method of claim 1 wherein the privileged area includes an active trusted computing base (ATCB), the ATCB performing attestation in the privileged area with the same trust assurances as a trusted platform module (TPM).

13. The method of claim 1 wherein the ATCB further performs an authenticated exchange with the user for transporting protected data, the authenticated exchange invoking a private key of the ATCB such that data sent by the user is receivable only by the ATCB.

14. An apparatus for providing a trusted computing environment comprising:
   a trusted computing base having a trusted platform module for establishing a trust level of the trusted computing base (TCB), the TCB having a privileged area in a system software stack operable for protected access, the trust level verifiable by an attestation function invokable by a user via a challenge, the challenge returning an authentication of the TCB to confirm the established trust level;
   an active trusted computing base (ATCB) interposed in the privileged area, the privileged area being between a hardware platform and other software executing on the TCB, the ATCB actively intercepting attempts to access the privileged area, the ATCB having an extension of the established trust level, the ATCB coupled to the TCB for intercepting user requests to invoke the TCB, the ATCB responsive to the challenge; and
   an interface to a remote challenger, the interface for responding to the challenges via the ATCB using the extended trust level, the challenges employing an attestation protocol for returning an attestation value based on the attestation function, the attestation value indicative of the trust level, the attestation value marked as protected by the ATCB, the ATCB actively intercepting and stopping unexpected access attempts to the marked attestation value;
   wherein the TCB establishes the trust level by:
      recording a sequence of instructions executed by the TCB during a boot sequence as a recorded boot sequence;
      generating the attestation value by computing a hash value on the sequence of instructions;
      storing the computed hash in the privileged area; and
      comparing the computed hash value to a known value indicative of a trusted environment, the known value being unlikely to result from a compromised environment.

15. The computing base of claim 14 wherein the TCB further establishes the trust level by:
   observing, from a trusted platform module (TPM) in communication with a hardware bus in the TCB, instructions sent over the hardware bus during the boot sequence; and
   signing, using a credential specific to the TPM, the computed hash value, the signed, computed hash value for providing assurances of the trust level according to the attestation protocol.

16. The method of claim 15 further comprising a privileged area, the privileged area in a system software stack and responsive to access attempts such that the TPM provides assurances of the trusted nature of the privileged area.

17. The computing base of claim 14 wherein the TCB and the ATCB define a trusted computing platform (TCP), the TCP extending the trust level for a plurality of users by:
   authenticating the recorded boot sequence at the TCB using a credential indicative of the TCB, the credential corresponding to a certificate in a public key infrastructure (PKI);
   validating the recorded boot sequence at the ATCB; and
   authenticating the recorded boot sequence using a credential of the ATCB, the authenticated, recorded boot sequence for responding to attestation challenges, extending the trust level of the TCB to the ATCB being performed by:
      authenticating a hash value of a recorded boot sequence with a private key of the ATCB; and
      validating the hash value by requesting users using the corresponding public key of the ATCB.

18. The computing base of claim 17 wherein the TCB responds to challenges by:
   receiving a message from a user, the message being a challenge according to an attestation protocol for verifying the trust level of the TCB;
   authenticating the attestation value of the TCB using a credential indicative of the ATCB; and
   validating the authenticated attestation value by a user to provide assurances of the trusted computing environment of the TCB.

19. A computer program product having computer program code on a non-transitory computer storage medium including a set of encoded instructions that, when executed by a processor, cause a computer to perform a method of providing a trusted computing environment, the method comprising:
   establishing a trust level of a trusted computing base (TCB), the trust level verifiable by an attestation function invokable by a user via a challenge, the challenge returning an authentication of the TCB to confirm the established trust level;
   extending the trust level to an Active Trusted Computing Base (ATCB), the ATCB coupled to the TCB for intercepting user requests to invoke the TCB, the ATCB responsive to the challenge, extending the trust level further comprising:
      interposing the active trusted computing base (ATCB) in a privileged area, the privileged area being between a hardware platform and other software executing on the TCB, the ATCB actively intercepting attempts to access the privileged area;
      authenticating a recorded boot sequence at the TCB using a credential indicative of the TCB;
      validating the recorded boot sequence at the ATCB;
      authenticating the recorded boot sequence using a credential of the ATCB, the authenticated, recorded boot sequence for responding to attestation challenges; and
      responding to the challenges via the ATCB using the extended trust level, the challenges employing an attestation protocol for returning an attestation value based on the attestation function, the attestation value indicative of the trust level, the ATCB being a hypervisor for providing a trusted computing environment to a plurality of users;
   establishing the trust level comprising:
      recording a sequence of instructions executed by the TCB during a boot sequence as the recorded boot sequence;
      generating the attestation value by computing a hash value on the sequence of instructions;
      storing the computed hash in the privileged area; and comparing the computed hash value to a known value indicative of a trusted environment, the known value being unlikely to result from a compromised environment;

marking the attestation value as protected, the ATCB actively intercepting and stopping unexpected access attempts to the marked attestation value;

receiving a request from a user to provide a trusted computing environment, the request further indicative of an operating system executing in the provided computing environment;

providing the trusted computing environment to the user, the user being a first user, and providing a second trusted computing environment to a second user, the second trusted computing environment having a different operating system.

* * * * *